US012566815B2

(12) United States Patent
Huang et al.

(10) Patent No.: US 12,566,815 B2
(45) Date of Patent: Mar. 3, 2026

(54) COMPUTER-IMPLEMENTED METHOD, ELECTRONIC DEVICE, AND NON-TRANSITORY COMPUTER-READABLE STORAGE MEDIUM FOR CONTEXT-AWARE CLASSIFICATION OF PHYSIOLOGICAL SIGNAL DATA

(71) Applicant: Industrial Technology Research Institute, Hsinchu (TW)

(72) Inventors: Sheng-Chi Huang, Taichung City (TW); Ting Yuan Wang, Taipei City (TW); Jung-Tzu Liu, Hsinchu City (TW); Ya-Wen Lee, Chiayi City (TW)

(73) Assignee: Industrial Technology Research Institute, Hsinchu (TW)

( * ) Notice: Subject to any disclaimer, the term of this patent is extended or adjusted under 35 U.S.C. 154(b) by 1143 days.

(21) Appl. No.: 17/527,173

(22) Filed: Nov. 16, 2021

(65) Prior Publication Data

US 2023/0122473 A1 Apr. 20, 2023

(30) Foreign Application Priority Data

Oct. 14, 2021 (TW) ................................. 110138083

(51) Int. Cl.
$G06N\ 3/045$ (2023.01)
$G06F\ 18/213$ (2023.01)
(Continued)

(52) U.S. Cl.
CPC ............ *G06F 18/213* (2023.01); *G06F 18/25* (2023.01); *G06N 3/045* (2023.01); *G06N 3/048* (2023.01)

(58) Field of Classification Search
CPC ...... G06F 18/213; G06F 18/25; G06F 18/241; G06N 3/045; G06N 3/048; G06N 3/0464; G06N 3/044
See application file for complete search history.

(56) References Cited

U.S. PATENT DOCUMENTS 6,735,579 B1 5/2004 Woodall
8,311,618 B2 11/2012 Vajdic et al.
(Continued)

FOREIGN PATENT DOCUMENTS

CN 105426889 3/2016
CN 109271975 1/2019
(Continued)

OTHER PUBLICATIONS

Cheng Dai et al., "Human action recognition using two-stream attention based LSTM networks", Applied Soft Computing, vol. 86, Jan. 2020, pp. 1-8.

(Continued)

*Primary Examiner* — Hien L Duong
(74) *Attorney, Agent, or Firm* — JCIPRNET

(57) ABSTRACT

A computer-implemented method, an electronic device, and a non-transitory computer-readable storage medium for context-aware classification of physiological signal data. The method includes the following. A data string is obtained. The data string is fed into a first deep neural network to generate a first feature map. Multi-dimensional data is generated based on the data string. The multi-dimensional data is fed into a second deep neural network to generate a second feature map. At least the first feature map and the second feature map are fused into a specific feature vector. The specific feature vector is fed into a machine learning model. The machine learning model outputs an identification result corresponding to the data string in response to the specific feature vector.

27 Claims, 10 Drawing Sheets

(51) Int. Cl.
    *G06F 18/25*       (2023.01)
    *G06N 3/048*       (2023.01)

(56)          References Cited

U.S. PATENT DOCUMENTS

| | | | |
|---|---|---|---|
| 8,655,817 | B2 | 2/2014 | Hasey et al. |
| 10,998,101 | B1 | 5/2021 | Tran et al. |
| 11,568,991 | B1 * | 1/2023 | Jain ......................... G16H 40/63 |
| 11,829,413 | B1 * | 11/2023 | Hao ........................ G06N 20/00 |
| 2020/0075167 | A1 | 3/2020 | Srivastava et al. |
| 2020/0090028 | A1 * | 3/2020 | Huang ............. G06V 30/19173 |
| 2020/0159603 | A1 * | 5/2020 | Panda ................... G06Q 30/016 |
| 2020/0327308 | A1 * | 10/2020 | Cheng ................... G06F 18/253 |
| 2021/0056413 | A1 * | 2/2021 | Cheung ................ G06N 3/0464 |
| 2021/0100471 | A1 * | 4/2021 | Yu ........................... G16H 50/20 |
| 2021/0118566 | A1 * | 4/2021 | Wang ........................ G06N 3/08 |
| 2021/0142497 | A1 * | 5/2021 | Pugh ........................ G06T 7/543 |
| 2022/0139066 | A1 * | 5/2022 | Yang .................... G06V 10/469 |
| | | | 382/156 |
| 2022/0146707 | A1 * | 5/2022 | Kim .......................... G06N 3/08 |
| 2022/0175287 | A1 * | 6/2022 | Li ............................. A61B 5/18 |
| 2022/0318553 | A1 * | 10/2022 | Ben Yahia ............... G06N 3/08 |
| 2022/0387115 | A1 * | 12/2022 | Barbagli ................... G06T 7/70 |
| 2023/0018194 | A1 * | 1/2023 | Huang ................... G06V 10/82 |
| 2023/0046274 | A1 * | 2/2023 | Chen ...................... G01S 13/931 |
| 2023/0089026 | A1 * | 3/2023 | Tran .......................... A61B 6/48 |
| | | | 705/2 |
| 2023/0134967 | A1 * | 5/2023 | Francesca .............. G06V 40/20 |
| | | | 382/103 |
| 2023/0293079 | A1 * | 9/2023 | Chen ...................... G06V 10/25 |
| 2024/0212843 | A1 * | 6/2024 | Kim ....................... G06N 3/088 |

FOREIGN PATENT DOCUMENTS

| | | |
|---|---|---|
| CN | 110162638 | 8/2019 |
| CN | 110352430 | 10/2019 |
| CN | 110969073 | 4/2020 |
| CN | 109109909 | 7/2020 |
| CN | 111443165 | 7/2020 |
| CN | 111582223 | 8/2020 |
| CN | 112270337 | 1/2021 |
| CN | 112668559 | 4/2021 |
| TW | 201227595 | 7/2012 |
| TW | I718422 | 2/2021 |

OTHER PUBLICATIONS

Yuanyao Lu et al., "Automatic Lip-Reading System Based on Deep Convolutional Neural Network and Attention-Based Long Short-Term Memory", Appl. Sci., vol. 9, Issue 8, Apr. 2019, pp. 1-12.

Dandan Liang et al., "Deep convolutional BiLSTM fusion network for facial expression recognition", The Visual Computer, vol. 36, Feb. 2019 pp. 499-508.

Shiyao Chen et al., "A Novel Attention Cooperative Framework for Automatic Modulation Recognition", IEEE Access, vol. 8, Jan. 2020, pp. 1-14.

Erting Pan et al., "Spectral-spatial classification for hyperspectral image based on a single GRU", Neurocomputing, vol. 387, Apr. 2020, pp. 150-160.

Dongli Wang et al., "Human action recognition based on multi-mode spatial-temporal feature fusion", 2019 22th International Conference on Information Fusion (FUSION), Jul. 2019, pp. 1-7.

Ruiying Lu et al., "RAFnet: Recurrent attention fusion network of hyperspectral and multispectral images", Signal Processing, vol. 177, Dec. 2020, pp. 1-16.

Luntian Mou et al., "Driver stress detection via multimodal fusion using attention-based CNN-LSTM", Expert Systems with Applications, vol. 173, Jul. 2021, pp. 1-10.

Rohan Banerjee et al., "A Hybrid CNN-LSTM Architecture for Detection of Coronary Artery Disease from ECG", Applied Intelligence, Aug. 2021, pp. 1-8.

Lidan Fu et al., "Hybrid Network with Attention Mechanism for Detection and Location of Myocardial Infarction Based on 12-Lead Electrocardiogram Signals", Sensors, vol. 20, Issue 4, Feb. 2020 , pp. 1-24.

Dae Ha Kim et al., "Multi-modal emotion recognition using semi-supervised learning and multiple neural networks in the wild", 19th ACM International Conference on Multimodal Interaction, Nov. 2017, pp. 529-535.

Mian Pan et al., "Radar HRRP Target Recognition Model Based on a Stacked CNN-Bi-RNN With Attention Mechanism", IEEE Transactions on Geoscience and Remote Sensing, Feb. 2021, pp. 1-14.

Dian Yu et al., "A Systematic Exploration of Deep Neural Networks for EDA-Based Emotion Recognition", Information, vol. 11, Issue 4, Apr. 2020, pp. 1-16.

Wei-Xun Zhang et al., "Signal-3L 3.0: Improving Signal Peptide Prediction through Combining Attention Deep Learning with Window-Based Scoring", J. Chem. Inf. Model., vol. 60, Issue 7, Jun. 2020, pp. 3679-3686.

Ziping Zhao et al., "Exploring Spatio-Temporal Representations by Integrating Attention-based Bidirectional-LSTM-RNNs and FCNs for Speech Emotion Recognition", Interspeech 2018, Sep. 2018, pp. 272-276.

Sen Jia et al., "Cascade Superpixel Regularized Gabor Feature Fusion for Hyperspectral Image Classification", IEEE Transactions on Neural Networks and Learning Systems , vol. 31, Issue 5, May 2020, pp. 1638-1652.

Kia Dashtipour et al., "A hybrid Persian sentiment analysis framework: Integrating dependency grammar based rules and deep neural networks", Neurocomputing, vol. 380, Mar. 2020, pp. 1-10.

Pei Li et al., "Real-time crash risk prediction on arterials based on LSTM-CNN", Accident Analysis & Prevention, vol. 135, Feb. 2020, pp. 1-9.

Aite Zhao et al., "A hybrid spatio-temporal model for detection and severity rating of Parkinson's disease from gait data", Neurocomputing, vol. 315, Nov. 2018, pp. 1-8.

Hao Sun et al., "Spectral-Spatial Attention Network for Hyperspectral Image Classification", IEEE Transactions on Geoscience and Remote Sensing, vol. 58, Issue 5, May 2020, pp. 3232-3245.

Wang Xiaohua et al., "Two-level attention with two-stage multi-task learning for facial emotion recognition", Journal of Visual Communication and Image Representation, vol. 62, Jul. 2019, pp. 217-225.

Ganchao Bao et al., abstract of "Fault diagnosis of reciprocating compressor based on group self-attention network", Measurement Science and Technology, vol. 31, Issue 6, Apr. 2020, pp. 1-4.

Zeeshan Ahmad et al., "CNN-Based Multistage Gated Average Fusion (MGAF) for Human Action Recognition Using Depth and Inertial Sensors", IEEE Sensors Journal, vol. 62, Jul. 2019, pp. 1-12.

Kaijun Zhu et al., "A Cuboid CNN Model With an Attention Mechanism for Skeleton-Based Action Recognition", IEEE Transactions on Multimedia, vol. 22, Issue 11, Nov. 2020, pp. 2977-2989.

Hao Liu et al., "Sequence-based Person Attribute Recognition with Joint CTC-Attention Model", Computer Vision and Pattern Recognition, arXiv:1811.08115, Nov. 2018, pp. 1-9.

Lei Zhang et al., "Deep learning for sentiment analysis: A survey", Wires, vol. 8, Issue 4, Mar. 2018, pp. 1-34.

Ruixi Zhu et al., "Attention-Based Deep Feature Fusion for the Scene Classification of High-Resolution Remote Sensing Images", Remote Sensing, vol. 11, Aug. 2019, pp. 1-23.

Haiman Tian et al., abstract of "Multimodal deep representation learning for video classification", World Wide Web, vol. 22, May 2018, pp. 1-15.

Xuanhan Wang et al., "Two-Stream 3-D convNet Fusion for Action Recognition in Videos With Arbitrary Size and Length", IEEE Transactions on Multimedia , vol. 20, Issue 3, Mar. 2018, pp. 634-644.

Cheng Dai et al., "Human action recognition using two-stream attention based LSTM networks", Applied Soft Computing, vol. 86, Jan. 2020, pp. 1-2.

Luntian Mou et al., "Driver stress detection via multimodal fusion using attention-based CNN-LSTM", Expert Systems with Applications, vol. 173, Jul. 2021, pp. 502-506.

(56) References Cited

OTHER PUBLICATIONS

Hari Mohan Rai et al., "A Hybrid CNN-LSTM Architecture for Detection of Coronary Artery Disease from ECG", Applied Intelligence, Aug. 2021, pp. 1-8.

Dian Yu et al., "A Systematic Exploration of Deep Neural Networks for EDA-Based Emotion Recognition", Information, vol. 11, Issue 4, Apr. 2020, pp. 502-506.

Ziping Zhao et al., "Exploring Spatio-Temporal Representations by Integrating Attention-based Bidirectional-LSTM-RNNs and FCNs for Speech Emotion Recognition", Interspeech 2018, Sep. 2018, pp. 270-276.

Ganchao Bao et al., "Fault diagnosis of reciprocating compressor based on group self-attention network", Measurement Science and Technology, vol. 31, Issue 6, Apr. 2020, pp. 1-4.

Kaijun Zhu et al., "A Cuboid CNN Model With an Attention Mechanism for Skeleton-Based Action Recognition", IEEE Transactions on Multimedia, vol. 22, Issue 11, Nov. 2020, pp. 1-13.

Haiman Tian et al., "Multimodal deep representation learning for video classification", World Wide Web, vol. 22, May 2018, pp. 1325-1341.

"Office Action of Taiwan Counterpart Application", issued on Aug. 1, 2022, p. 1-p. 5.

* cited by examiner

221

222

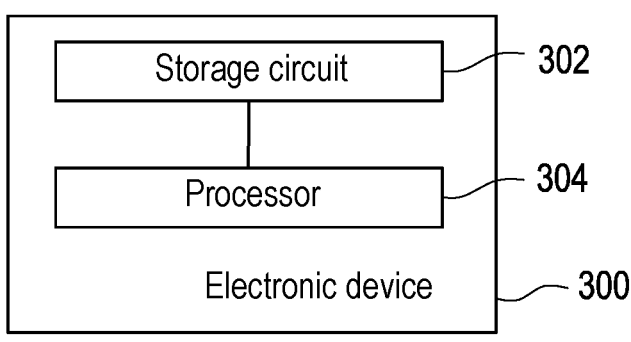

Storage circuit — 302

Processor — 304

Electronic device — 300

FIG. 3

Obtain a first data string — S410

S420 — Feed the first data string into a first deep neural network, wherein the first deep neural network generates a first feature map by extracting features of the first data string S430 — Generate a multi-dimensional data based on the first data string S440 — Feed the multi-dimensional data into a second deep neural network, wherein the second deep neural network generates a second feature map by extracting features of the multi-dimensional data Fuse the first feature map and the second feature map into a specific feature vector — S450

Feed the specific feature vector into a machine learning model, wherein the machine learning model outputs an identification result corresponding to the first data string in response to the specific feature vector — S460

FIG. 4

COMPUTER-IMPLEMENTED METHOD, ELECTRONIC DEVICE, AND NON-TRANSITORY COMPUTER-READABLE STORAGE MEDIUM FOR CONTEXT-AWARE CLASSIFICATION OF PHYSIOLOGICAL SIGNAL DATA

CROSS-REFERENCE TO RELATED APPLICATION

This application claims the priority benefit of Taiwanese application no. 110138083, filed on Oct. 14, 2021. The entirety of the above-mentioned patent application is hereby incorporated by reference herein and made a part of this specification.

TECHNICAL FIELD

The disclosure relates to a method, an electronic device, and a computer-readable storage medium for performing identification based on multi-modal data.

BACKGROUND

In the conventional art, signal classification technology as generally referred to mostly uses certain trained classifiers (e.g., deep neural network (DNN), support vector machine (SVM), random forest, etc.) to classify signals/data strings with a single dimension. However, it may be difficult to achieve an ideal classification in some cases in this way of classification.

For example, when determining whether an electrocardiogram signal of a human being is abnormal, doctors generally make judgments based on waveform changes on a two-dimensional electrocardiogram, rather than directly making determination based on the original one-dimensional electrocardiogram values/data.

Moreover, during training of a classifier that can perform determination based on a one-dimensional electrocardiogram signal, since the one-dimensional electrocardiogram signal records an electrocardio-physiological activity (of which the unit is millivolt) that changes over time, the classifier may only learn features of voltage change during the training, but not some clinically important features, such as changes in RR intervals (i.e., durations between R waves of two adjacent heartbeats). In addition, if the classifier is set to learn only on the basis of the two-dimensional electrocardiogram, the classifier may not be able to learn the feature of the voltage change.

SUMMARY

The disclosure provides a method, an electronic device, and a computer-readable storage medium for performing identification based on multi-modal data.

An exemplary embodiment of the disclosure provides a method for performing identification based on multi-modal data, including the following. A first data string is obtained. The first data string is fed into a first deep neural network. The first deep neural network generates a first feature map by extracting features of the first data string. A multi-dimensional data is generated based on the first data string. A dimension of the multi-dimensional data is higher than a dimension of the first data string. The multi-dimensional data is fed into a second deep neural network. The second deep neural network generates a second feature map by extracting features of the multi-dimensional data. At least the first feature map and the second feature map are fused into a specific feature vector. The specific feature vector is fed into a machine learning model. The machine learning model outputs an identification result corresponding to the first data string in response to the specific feature vector.

An exemplary embodiment of the disclosure provides an electronic device for performing identification based on multi-modal data. The electronic device includes a storage circuit and a processor. The storage circuit stores a programming code. The processor is coupled to the storage circuit and accesses the programming code to: obtain a first data string; feed the first data string into a first deep neural network, where the first deep neural network generates a first feature map by extracting features of the first data string; generate a multi-dimensional data based on the first data string, where a dimension of the multi-dimensional data is higher than a dimension of the first data string; feed the multi-dimensional data into a second deep neural network, where the second deep neural network generates a second feature map by extracting features of the multi-dimensional data; fuse at least the first feature map and the second feature map into a specific feature vector; and feed the specific feature vector into a machine learning model, where the machine learning model outputs an identification result corresponding to the first data string in response to the specific feature vector.

An exemplary embodiment of the disclosure provides a computer-readable storage medium. The computer-readable storage medium records an executable computer program. The executable computer program is loaded by an electronic device to: obtain a first data string; feed the first data string into a first deep neural network, where the first deep neural network generates a first feature map by extracting features of the first data string; generate a multi-dimensional data based on the first data string, where a dimension of the multi-dimensional data is higher than a dimension of the first data string; feed the multi-dimensional data into a second deep neural network, where the second deep neural network generates a second feature map by extracting features of the multi-dimensional data; fuse at least the first feature map and the second feature map into a specific feature vector; and feed the specific feature vector into a machine learning model, where the machine learning model outputs an identification result corresponding to the first data string in response to the specific feature vector.

Based on the foregoing, in the disclosure, the corresponding first feature map may be obtained after the first data string is obtained. In addition, in the disclosure, the first data string may also be converted into the corresponding multi-dimensional data, and then the corresponding second feature map may be obtained. After that, in the disclosure, the first feature map and the second feature map may be fused into the specific feature vector through a specific mechanism. Then, the trained machine learning model may output the corresponding identification result based on the specific feature vector.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 3 is a schematic diagram of an electronic device for performing identification based on multi-modal data according to an exemplary embodiment of the disclosure.

FIG. 4 is a flowchart of a method for performing identification based on multi-modal data according to a first embodiment of the disclosure.

DESCRIPTION OF THE EMBODIMENTS

Figure 1A:
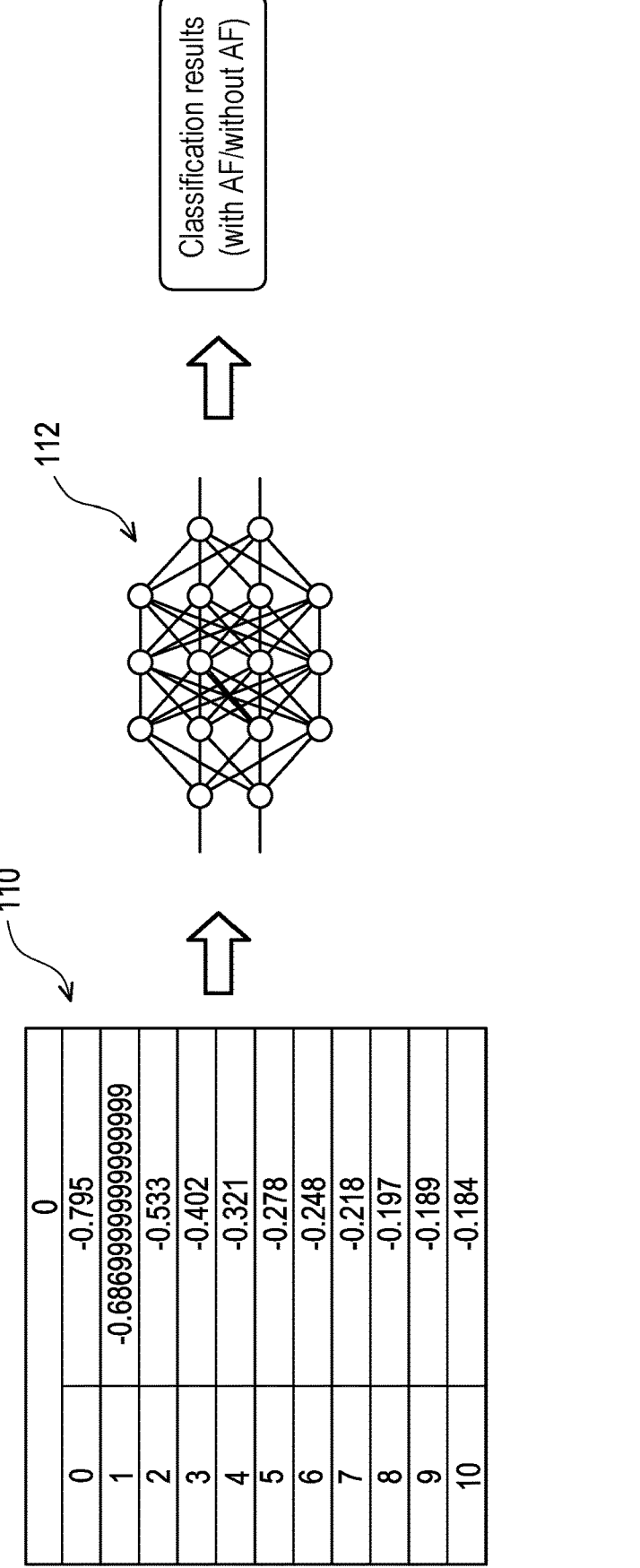
FIG. 1A is a schematic diagram of classification performed based on a one-dimensional data string according to an exemplary embodiment of the disclosure.

With reference to FIG. 1A, FIG. 1A is a schematic diagram of classification performed based on a one-dimensional data string according to an exemplary embodiment of the disclosure. In FIG. 1A, it is assumed that a data string 110 is a one-dimensional electrocardiogram signal measured from a patient, and a classifier 112 is, for example, a determination model (which is, for example, a deep learning network/machine learning model) that determines whether the data string 110 includes atrial fibrillation (AF) symptoms.

As mentioned previously, the classifier 112 may not be able to achieve classification because it is not able to learn some clinically important features during the training process. This will be further described below.

Figure 1B:
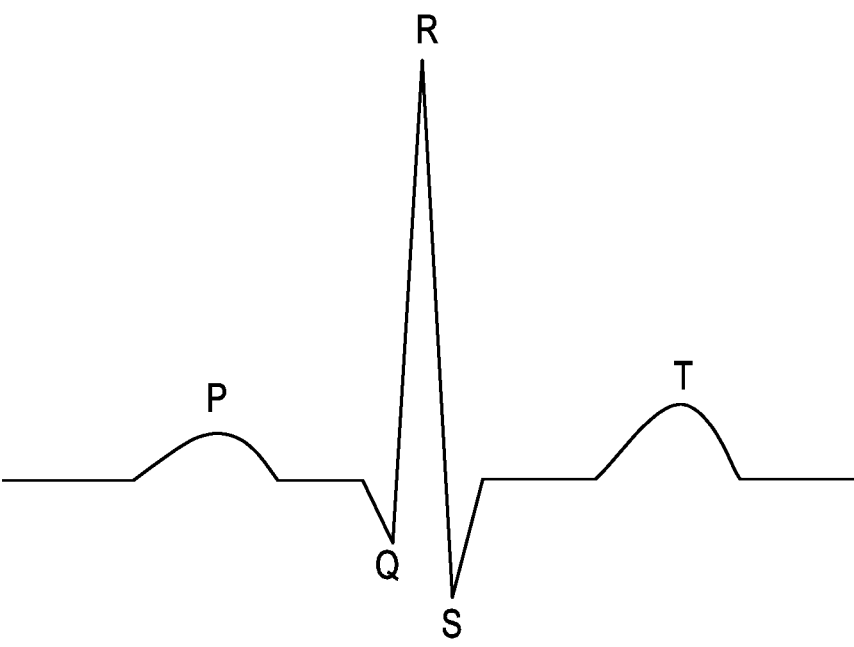
FIG. 1B is a normal electrocardiogram corresponding to a single heartbeat according to an exemplary embodiment of the disclosure.

With reference to FIG. 1B, FIG. 1B is a normal electrocardiogram corresponding to a single heartbeat according to an exemplary embodiment of the disclosure. It can be seen from FIG. 1B that an electrocardiogram corresponding to a normal heartbeat includes P, Q, R, S, T and other waveforms, where R corresponds to the previously mentioned R wave, and a P wave is generated in response to depolarization of the atria, for example.

Figure 1C:
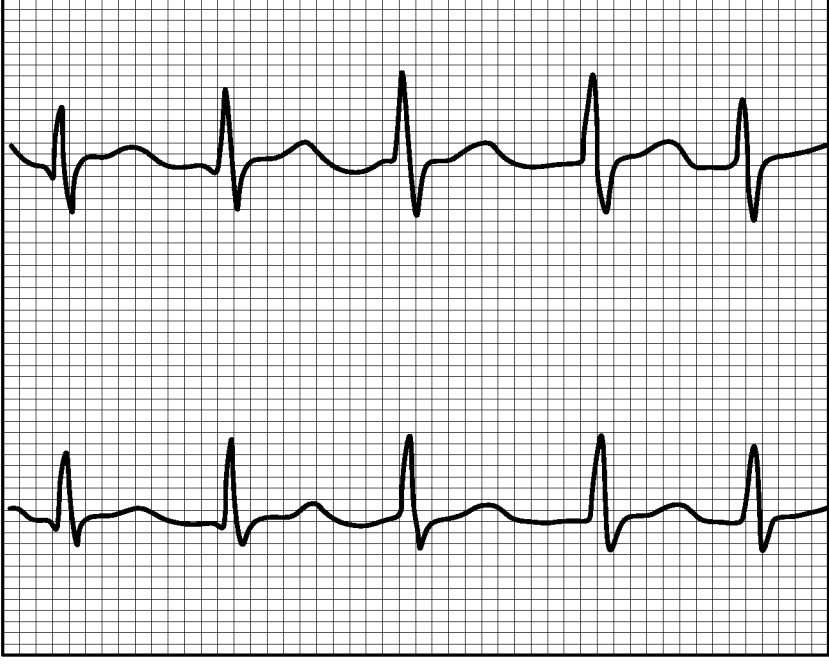
FIG. 1C is an electrocardiogram of a patient with AF according to an exemplary embodiment of the disclosure.

Then, with reference to FIG. 1C, FIG. 1C is an electrocardiogram of a patient with AF according to an exemplary embodiment of the disclosure. It can be seen from FIG. 1C that in addition to irregular ventricular rhythms, the P wave derived from the depolarization of the atria does not exist either. These clinical features cannot be learned by the classifier 112 during the training process of the classifier 112. Therefore, if the classifier 112 is set to make a determination based on a one-dimensional electrocardiogram signal corresponding to FIG. 1C, it may erroneously determine that no AF symptoms are shown in FIG. 1C.

Figure 2A:
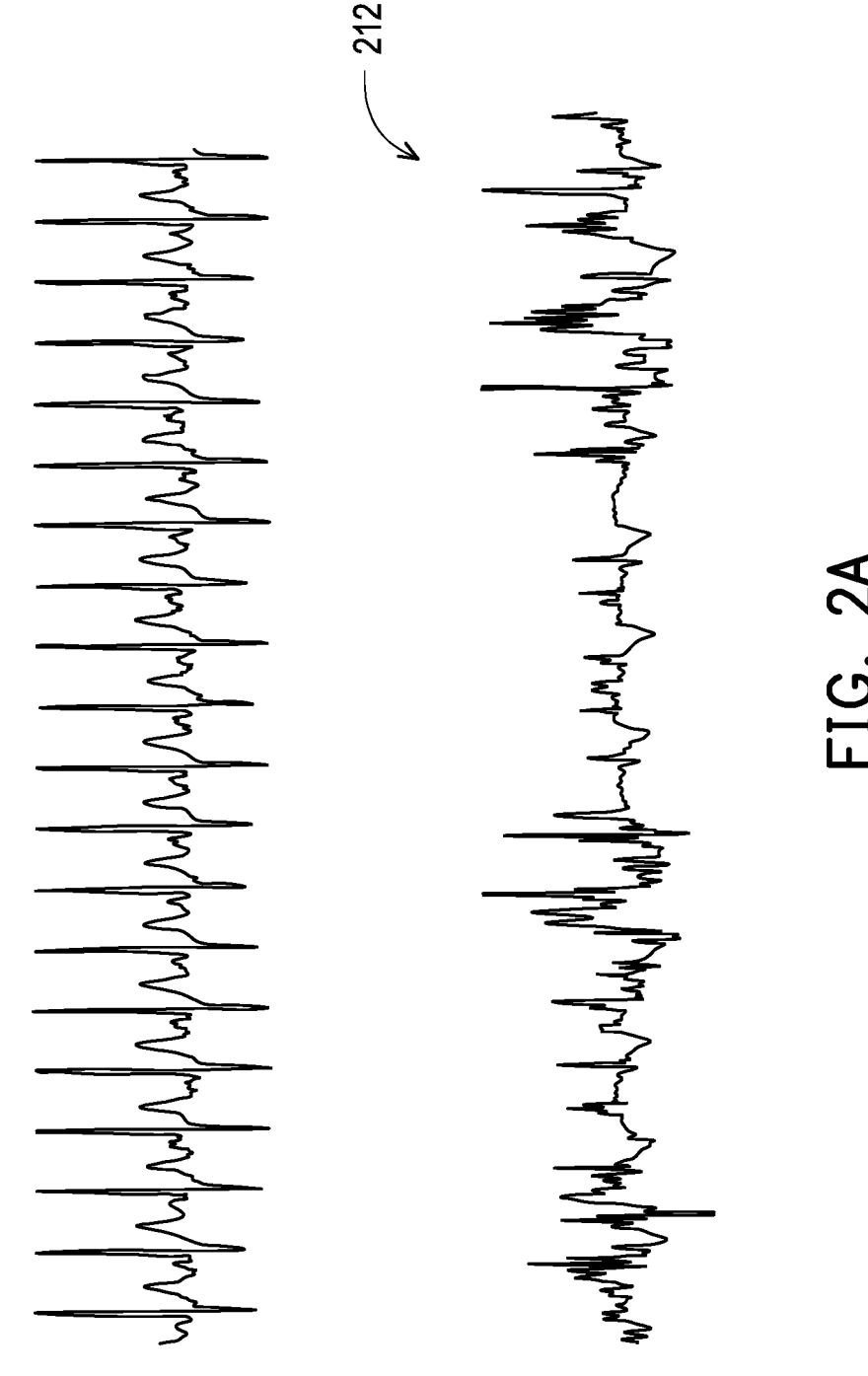
FIG. 2A is a plurality of electrocardiograms without an AF symptom according to an exemplary embodiment of the disclosure.

With reference to FIG. 2A, FIG. 2A is a plurality of electrocardiograms without an AF symptom according to an exemplary embodiment of the disclosure. In this embodiment, since RR intervals in an electrocardiogram 211 are regular, it should be able to correctly determine that the electrocardiogram 211 includes no AF symptoms. However, if the classifier 112 is set to make a determination based on a one-dimensional electrocardiogram signal (e.g., the amount of voltage change) corresponding to the electrocardiogram 211, then the classifier 112 may erroneously determine that the electrocardiogram 211 includes AF symptoms because the classifier 112 has not learned that RR intervals may be irregular.

In addition, in an electrocardiogram 212, since there exists relatively much noise, RR intervals are caused to look seemly irregular. In this case, the electrocardiogram 212 may be erroneously determined to include AF symptoms. However, if the classifier 112 is set to make a determination based on a one-dimensional electrocardiogram signal corresponding to the electrocardiogram 212, since features learned by the classifier 112 are different, the classifier 112 may still correctly determine that the electrocardiogram 212 include no AF symptoms.

Figure 2B:
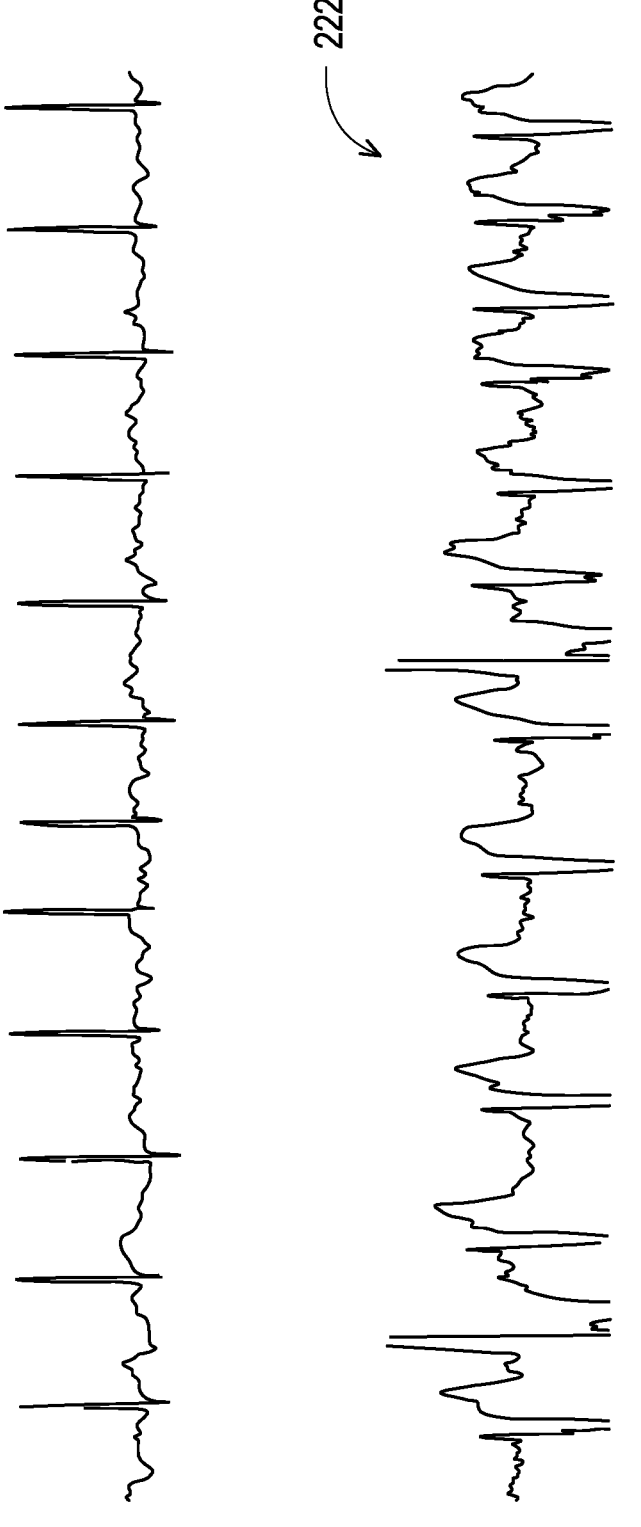
FIG. 2B is a plurality of electrocardiograms with an AF symptom according to an exemplary embodiment of the disclosure.

With reference to FIG. 2B, FIG. 2B is a plurality of electrocardiograms with an AF symptom according to an exemplary embodiment of the disclosure. In this embodiment, since RR intervals in an electrocardiogram 221 are irregular, it should be able to correctly determine that the electrocardiogram 221 includes AF symptoms. However, if the classifier 112 is set to make a determination based on a one-dimensional electrocardiogram signal (e.g., the amount of voltage change) corresponding to the electrocardiogram 221, then the classifier 112 may erroneously determine that the electrocardiogram 221 includes no AF symptoms because the classifier 112 has not learned that RR intervals may be irregular.

In addition, in an electrocardiogram 222, since a huge T wave is present, it may be difficult to identify whether the electrocardiogram 222 includes AF symptoms. However, if the classifier 112 is set to make a determination based on a one-dimensional electrocardiogram signal corresponding to the electrocardiogram 222, since features learned by the classifier 112 are different, the classifier 112 may still correctly determine that the electrocardiogram 222 includes AF symptoms.

The disclosure provide a method and a device for performing identification based on multi-modal data, in which a relatively accurate determination can be made accordingly after data of multiple dimensions is fused, which will be further described below.

With reference to FIG. 3, FIG. 3 is a schematic diagram of an electronic device for performing identification based on multi-modal data according to an exemplary embodiment of the disclosure. In some embodiments, the electronic device 300 may be embodied as various computer devices and/or smart devices. In FIG. 3, the electronic device 300 may include a storage circuit 302 and a processor 304.

The storage circuit 302 is, for example, any form of fixed or removable random access memory (RAM), read-only memory (ROM), flash memory, hard disk, or other similar devices or a combination of these devices, and may be configured record a plurality of programming codes or modules.

The processor 304 is coupled to the storage circuit 302, and may be a general-purpose processor, a special-purpose processor, a traditional processor, a digital signal processor, a plurality of microprocessors, one or more microprocessors combined with a digital signal processor core, a controller, a microcontroller, an application specific integrated circuit (ASIC), a field programmable gate array (FPGA), any other form of integrated circuit, a state machine, a processor based on Advanced RISC Machine (ARM), and the like.

In an exemplary embodiment of the disclosure, the processor 304 may access the modules or programming codes recorded in the storage circuit 302 to implement the method for performing identification based on multi-modal data provided by the disclosure, which will be described in detailed as follows.

Figure 5A:
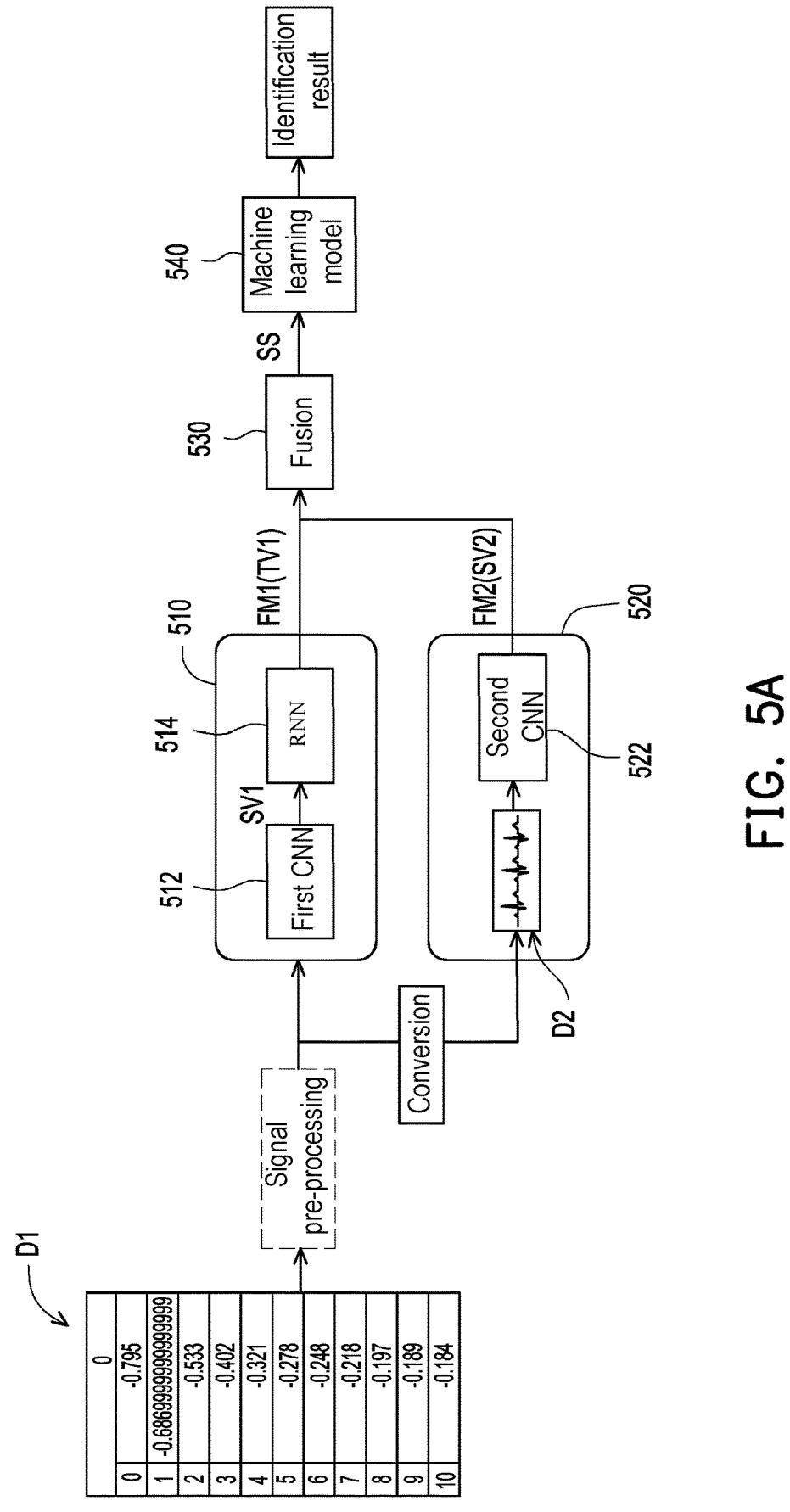
FIG. 5A is a diagram of an application scenario according to the first embodiment of the disclosure.

With reference to FIG. 4, FIG. 4 is a flowchart of a method for performing identification based on multi-modal data according to a first embodiment of the disclosure. The method of this embodiment may be performed by the electronic device 300 of FIG. 3. The details of each step of FIG. 4 accompanied with the elements shown in FIG. 3 will be described below. In addition, in order to make the concept of the disclosure more comprehensible, further description will be provided below with the aid of FIG. 5A. FIG. 5A is a diagram of an application scenario according to the first embodiment of the disclosure.

First, in step S410, the processor 304 may obtain a first data string D1. In different embodiments, the first data string D1 is, for example, a data string composed of a plurality of data with a single dimension. For ease of description, it is assumed in the following that the first data string D1 is a one-dimensional electrocardiogram signal measured from a patient as mentioned previously, but the disclosure is not limited thereto.

In an exemplary embodiment, after obtaining the first data string D1, the processor 304 may perform certain signal pre-processing on the first data string D1 to eliminate baseline drift and/or filter out certain noise, thus enhancing the signal quality of the first data string D1, but the disclosure is not limited thereto.

After that, in step S420, the processor 304 may feed the first data string D1 into a first deep neural network 510. The first deep neural network 510 may generate a first feature map FM1 by extracting features of the first data string D1.

In FIG. 5A, the first deep neural network 510 may include a first convolutional neural network (CNN) 512 and a recurrent neural network (RNN) 514 connected in series. In different embodiments, designers may adjust parameters and manners for implementing the first convolutional neural network 512 and the recurrent neural network 514 as required. In an exemplary embodiment, the recurrent neural network 514 may be embodied as, for example but not limited to, a long-short term memory (LSTM) model.

In an exemplary embodiment, the processor 304 may feed the (signal pre-processed) first data string D1 into the first convolutional neural network 512. The first convolutional neural network 512 may output a first spatial feature vector SV1 in response to the first data string D1. In an exemplary embodiment, the first convolutional neural network 512 may be understood as generating the first spatial feature vector SV1 by extracting relevant one-dimensional spatial features in the first data string D1, but the disclosure is not limited thereto.

In addition, the processor 304 may feed the first spatial feature vector SV1 into the recurrent neural network 514. The recurrent neural network 514 may output a first temporal feature vector TV1 as the first feature map FM1 in response to the first spatial feature vector SV1. In an exemplary embodiment, the recurrent neural network 514 may be understood as generating the first temporal feature vector TV1 (i.e., the first feature map FM1) by extracting relevant temporal features in the first spatial feature vector SV1, but the disclosure is not limited thereto.

Moreover, after obtaining the first data string D1 through step S410, the processor 304 may also perform step S430 to generate multi-dimensional data D2 based on the first data string D1. In different embodiments, the multi-dimensional data D2 is, for example, an image drawn/converted by the processor 304 based on the first data string D1. In some embodiments, the multi-dimensional data D2 is, for example, a waveform image drawn/converted by the processor 304 based on the first data string D1. Nonetheless, the disclosure is not limited thereto.

In the scenario of FIG. 5A, since the first data string D1 is assumed to be a one-dimensional electrocardiogram signal, the image drawn by the processor 304 based on the first data string D1 is, for example but not limited to, an electrocardiogram shown by the multi-dimensional data D2 in FIG. 5A.

After that, in step S440, the processor 304 may feed the multi-dimensional data D2 into a second deep neural network 520. The second deep neural network 520 may generate a second feature map FM2 by extracting features of the multi-dimensional data D2.

In FIG. 5A, the second deep neural network 520 may include a second convolutional neural network 522. In this case, the processor 304 may feed the multi-dimensional data D2 into the second convolutional neural network 522. The second convolutional neural network 522 may output a second spatial feature vector SV2 as the second feature map FM2 in response to the multi-dimensional data D2. In an exemplary embodiment, the second convolutional neural network 522 may be understood as generating the second spatial feature vector SV2 by extracting relevant two-dimensional spatial features in the multi-dimensional data D2, but the disclosure is not limited thereto.

After obtaining the first feature map FM1 and the second feature map FM2, the processor 304 may perform step S450 to fuse the first feature map FM1 and the second feature map FM2 into a specific feature vector SS.

In FIG. 5A, the processor 304 may fuse the first feature map FM1 and the second feature map FM2 into the specific feature vector SS by, for example, performing a fusion mechanism 530. Details of the fusion mechanism 530 will be further described with the aid of FIG. 5B.

Figure 5B:
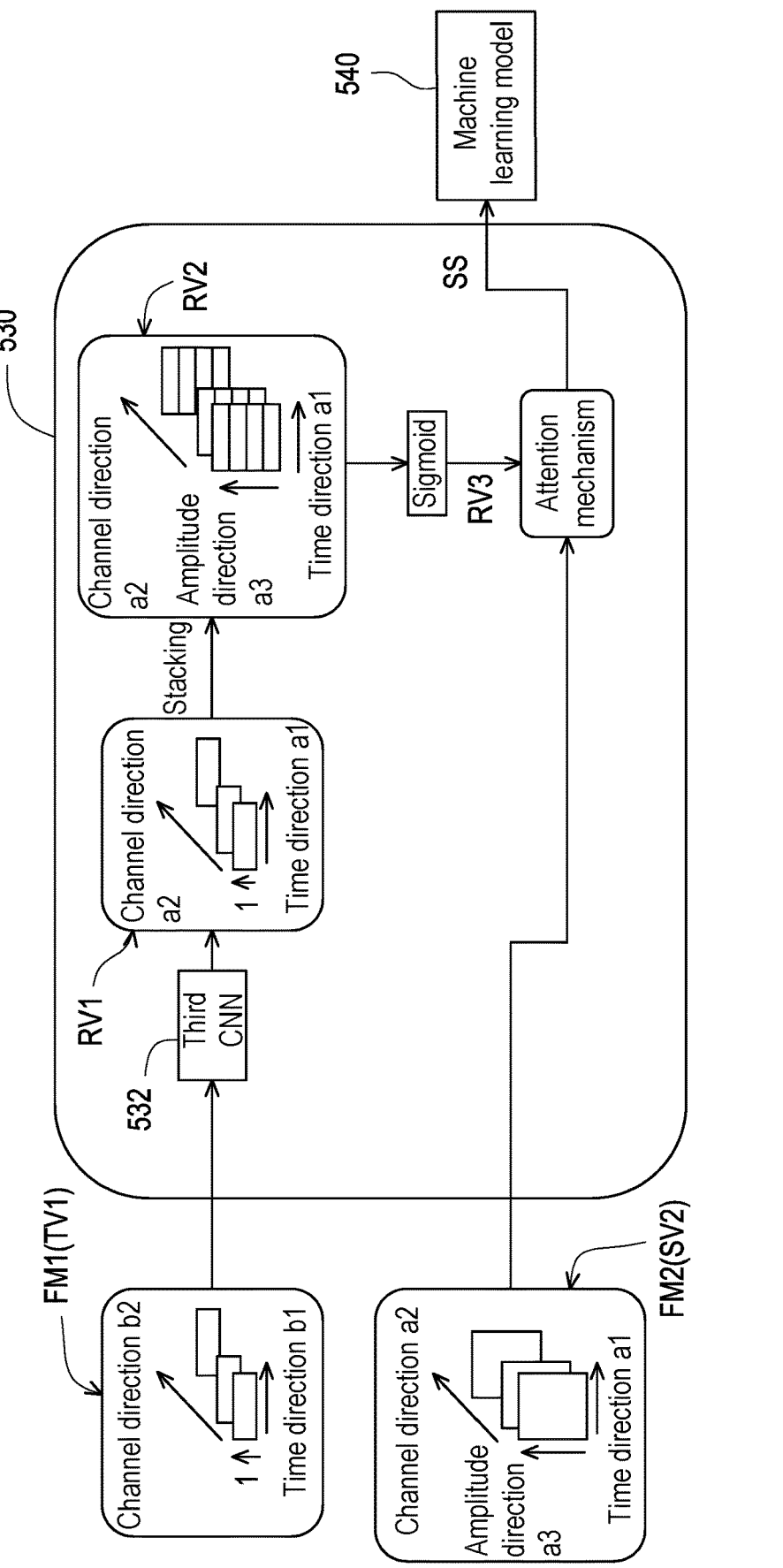
FIG. 5B is a schematic diagram of the fusion mechanism according to the first embodiment of the disclosure.

With reference to FIG. 5B, FIG. 5B is a schematic diagram of the fusion mechanism according to the first embodiment of the disclosure. In FIG. 5B, the first feature map FM1 may have three dimensions, such as amplitude, time, and channel. A magnitude in the dimension of amplitude of the first feature map FM1 may be 1 (as the first data string D1 is one-dimensional). In addition, magnitudes in dimensions such as time and channel of the first feature map FM1 may be respectively represented by b1 and b2. Nonetheless, the disclosure is not limited thereto. In some embodiments, a size of the first feature map FM1 may be expressed by b1×b2×1, but is not limited thereto.

In other embodiments, when the first data string D1 has other dimensions, the magnitude in the dimension of amplitude of the corresponding first feature map FM1 may be other values other than 1, and is not limited to what is shown in FIG. 5A.

In addition, the second feature map FM2 may have three dimensions, such as amplitude, time, and channel. Magnitudes in the three dimensions of the second feature map FM2 may be represented by a1, a2, and a3, but are not limited thereto. In some embodiments, a size of the second feature map FM2 may be expressed by a1×a2×a3, but is not limited thereto.

In an exemplary embodiment, the processor 304 may feed the first feature map FM1 into a third convolutional neural network 532. The third convolutional neural network 532 may output a first reference feature vector RV1 in response to the first feature map FM1.

In FIG. 5B, the third convolutional neural network 532 may convert the first feature map FM1 into the first reference feature vector RV1 according to the magnitudes in dimensions such as channel and time of the second feature map FM2. Magnitudes in dimensions such as channel and time of the first reference feature vector RV1 may be the same as the magnitudes in dimensions such as channel and time of the second feature map FM2. In other words, the magnitudes in dimensions such as channel and time of the first reference feature vector RV1 may be respectively a1 and a2. In this case, a size of the first reference feature vector RV1 may be expressed by a1×a2×1, but is not limited thereto.

After that, the processor 304 may stack a plurality of first reference feature vectors RV1 into a second reference feature vector RV2 according to the size of the second feature map FM2. The size of the second feature map FM2 is the same as a size of the second reference feature vector RV2.

In FIG. 5B, the processor 304 may generate the second reference feature vector RV2 by stacking an a3 number of first reference feature vectors RV1 in the longitudinal direction. In this case, the size of the second reference feature vector RV2 may be expressed by a1×a2×a3 (which is the same as the size of the second feature map FM2).

After that, the processor 304 may convert the second reference feature vector RV2 into a third reference feature vector RV3. Each element in the third reference feature vector RV3 may be between 0 and 1. In an exemplary embodiment, the processor 304 may input the second reference feature vector RV2 into a Sigmoid function. The Sigmoid function may output the third reference feature vector RV3 in response to the second reference feature vector RV2. In an exemplary embodiment, the Sigmoid function may convert/map each element in the second reference feature vector RV2 into a value between 0 and 1, thus forming the third reference feature vector RV3, but the disclosure is not limited thereto.

In addition to the Sigmoid function, the processor 304 may also convert the second reference feature vector RV2 into the third reference feature vector RV3 by using other functions, for example but not limited to, Tan h function (which causes each element in the third reference feature vector RV3 to be between −1 and 1), Soft max function, rectified linear unit (ReLU), etc.

Then, the processor 304 may generate the specific feature vector SS based on the second feature map FM2 and the third reference feature vector RV3. In an exemplary embodiment, since the second feature map FM2 and the third reference feature vector RV3 have the same size, the processor 304 may generate the specific feature vector SS by performing an attention mechanism (e.g., dot product/dot addition/matrix inner product, etc.) based on the second feature map FM2 and the third reference feature vector RV3, but the disclosure is not limited thereto.

Further, although the first feature map FM1 and the second feature map FM2 in FIG. 5B are derived from the first data string D1 and the multi-dimensional data D2 with different forms of data, the first data string D1 and the multi-dimensional data D2 have the same length in time. Based on this, the first feature map FM1 and the second feature map FM2 may be fused based on the time dimension through the mechanism of FIG. 5B.

In this case, since the first deep neural network 510 and the second deep neural network 520 have different designs and process data of different dimensions, the first feature map FM1 (i.e., the first temporal feature vector TV1) generated by the first deep neural network 510 and the second feature map FM2 (i.e., the second spatial feature vector SV2) generated by the second deep neural network 520 have different sizes. Therefore, the first feature map FM1 may be converted into the first reference feature vector RV1 (which has the same magnitudes in dimensions such as time and channel as the second feature map FM2 does) through the third convolutional neural network 532.

In addition, since the second feature map FM2 has one additional longitudinal dimension, the processor 304 may repeatedly stack the first reference feature vector RV1 into the second reference feature vector RV2 (which has the same size as the second feature map FM2 does).

After that, the processor 304 may generate the third reference feature vector RV3 by converting each element in the second reference feature vector RV2 into a value between 0 and 1 (which may be understood as a weight) through the Sigmoid function. Then, the processor 304 may further perform an attention mechanism (e.g., dot product/dot addition/matrix inner product, etc.) on the third reference feature vector RV3 and the second feature map FM2. Accordingly, the features corresponding to the one-dimensional data and the features corresponding to the multi-dimensional data may be appropriately fused to generate the specific feature vector SS, facilitating subsequent classification operations.

After obtaining the specific feature vector SS, in step S460, the processor 304 may feed the specific feature vector SS into a machine learning model 540. The machine learning model 540 may output an identification result corresponding to the first data string D1 in response to the specific feature vector SS. In an exemplary embodiment, the identification result may indicate, for example but not limited to, whether the first data string D1 includes AF symptoms.

In an exemplary embodiment, in order for the machine learning model 540 to have the above capabilities, during the training process of the machine learning model 540, the designer may feed specially designed training data into the machine learning model 540 for the corresponding learning by the machine learning model 540. For example, after obtaining a certain first data string that has been labeled as corresponding to AF (e.g., a one-dimensional electrocardiogram signal measured from a patient with AF), the processor 304 may generate a corresponding specific feature vector according to the above teaching in the first embodiment, and feed the specific feature vector into the machine learning model 540. Accordingly, the machine learning model 540 can learn AF-related features from the specific feature vector. In this case, when the machine learning model 540 receives the specific feature vector SS corresponding to the first data string D1 in the future, the machine learning model 540 may accordingly determine whether the first data string D1 includes AF symptoms, but the disclosure is not limited thereto.

Figure 6:
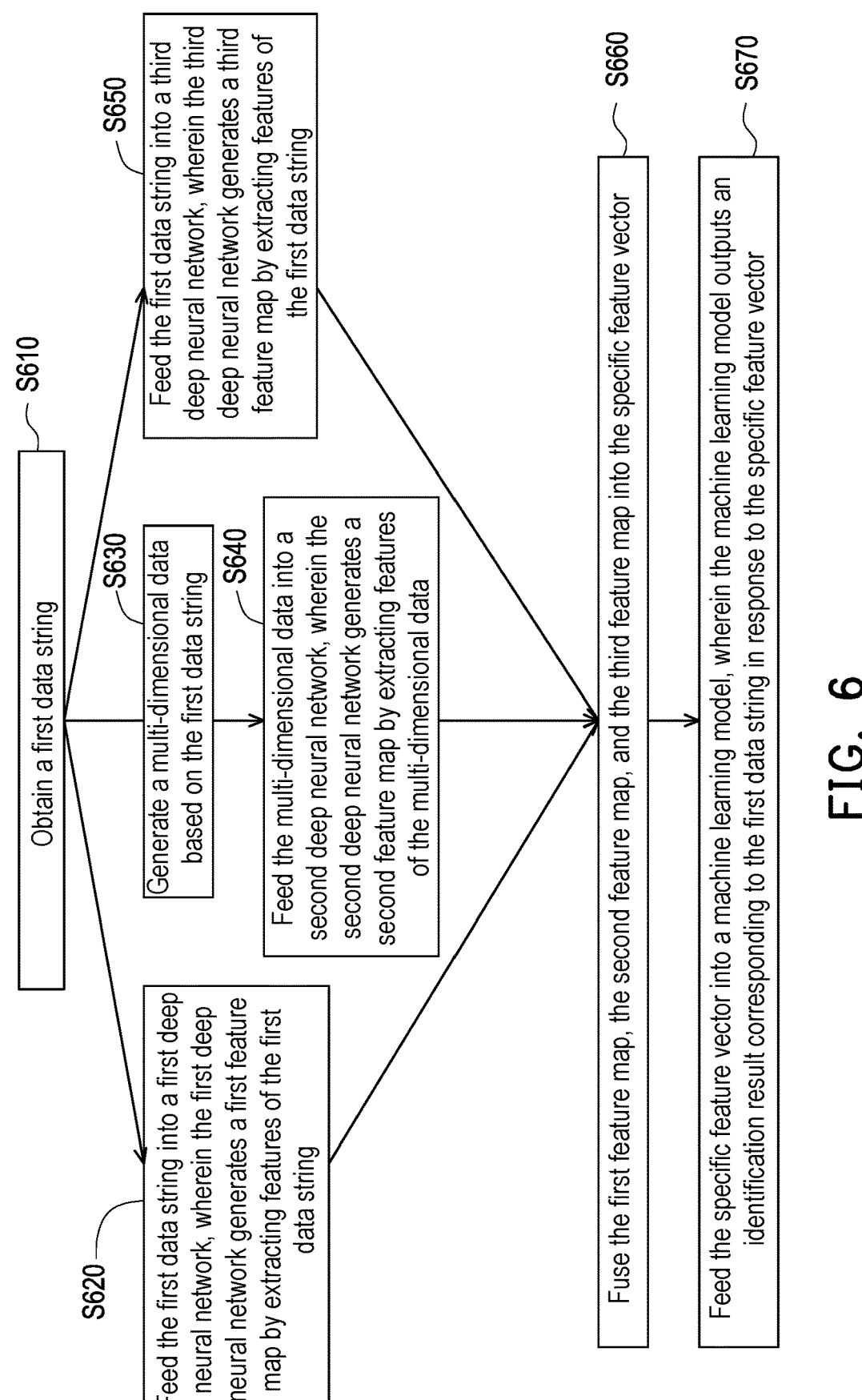
FIG. 6 is a flowchart of a method for performing identification based on multi-modal data according to a second embodiment of the disclosure.
Figure 7A:
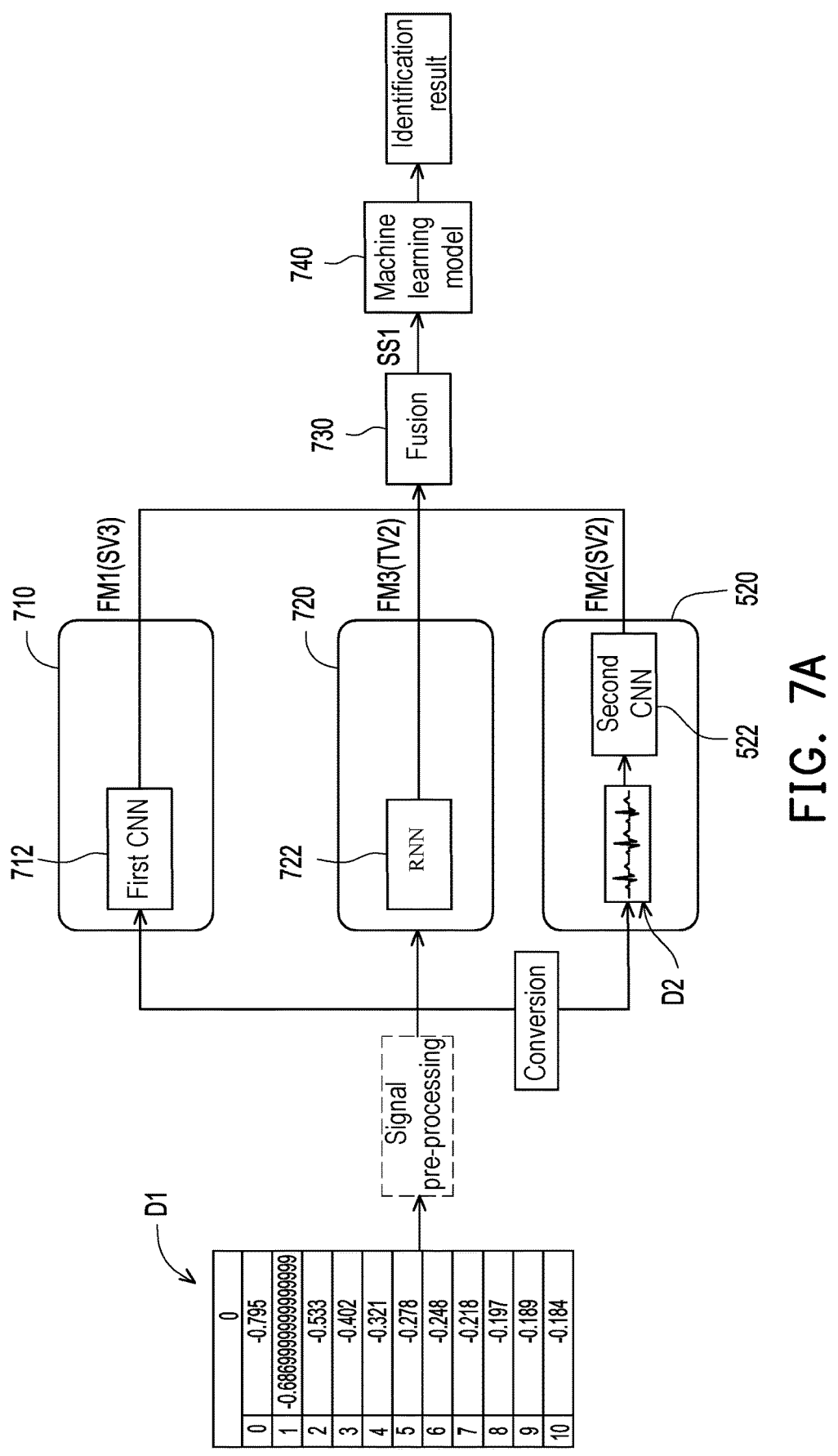
FIG. 7A is a diagram of an application scenario according to the second embodiment of the disclosure.

With reference to FIG. 6, FIG. 6 is a flowchart of a method for performing identification based on multi-modal data according to a second embodiment of the disclosure. The method of this embodiment may be performed by the electronic device 300 of FIG. 3. The details of each step of FIG. 6 accompanied with the elements shown in FIG. 3 will be described below. In addition, in order to make the concept of the disclosure more comprehensible, further description will be provided below with the aid of FIG. 7A. FIG. 7A is a diagram of an application scenario according to the second embodiment of the disclosure.

First, in step S610, the processor 304 may obtain the first data string D1. In different embodiments, the first data string D1 is, for example, a data string composed of a plurality of data with a single dimension. For ease of description, it is assumed in the following that the first data string D1 is a one-dimensional electrocardiogram signal measured from a patient as mentioned previously, but the disclosure is not limited thereto.

In an exemplary embodiment, after obtaining the first data string D1, the processor 304 may perform certain signal pre-processing on the first data string D1 to eliminate baseline drift and/or filter out certain noise, thus enhancing the signal quality of the first data string D1, but the disclosure is not limited thereto.

After that, in step S620, the processor 304 may feed the first data string D1 into a first deep neural network 710. The first deep neural network 710 may generate the first feature map FM1 by extracting features of the first data string D1.

In FIG. 7A, the first deep neural network 710 may include a first convolutional neural network 712. In an exemplary embodiment, the processor 304 may feed the first data string D1 into the first convolutional neural network 712. The first convolutional neural network 712 may output a third spatial feature vector SV3 as the first feature map FM1 in response to the first data string D1. In an exemplary embodiment, the first convolutional neural network 712 may be understood as generating the third spatial feature vector SV3 by extracting relevant (one-dimensional) spatial features in the first data string D1, but the disclosure is not limited thereto.

Moreover, after obtaining the first data string D1 through step S610, the processor 304 may also perform step S630 to generate the multi-dimensional data D2 based on the first data string D1. In different embodiments, the multi-dimensional data D2 is, for example, an image drawn/converted by the processor 304 based on the first data string D1. In some embodiments, the multi-dimensional data D2 is, for example, a waveform image drawn/converted by the processor 304 based on the first data string D1. Nonetheless, the disclosure is not limited thereto.

In the scenario of FIG. 7A, since the first data string D1 is assumed to be a one-dimensional electrocardiogram signal, the image drawn by the processor 304 based on the first data string D1 is, for example but not limited to, an electrocardiogram shown by the multi-dimensional data D2 in FIG. 7A.

After that, in step S640, the processor 304 may feed the multi-dimensional data D2 into the second deep neural network 520. The second deep neural network 520 may generate the second feature map FM2 by extracting features of the multi-dimensional data D2.

In FIG. 7A, the second deep neural network 520 may include the second convolutional neural network 522. In this case, the processor 304 may feed the multi-dimensional data D2 into the second convolutional neural network 522. The second convolutional neural network 522 may output the second spatial feature vector SV2 as the second feature map FM2 in response to the multi-dimensional data D2. In an exemplary embodiment, the second convolutional neural network 522 may be understood as generating the second spatial feature vector SV2 by extracting relevant two-dimensional spatial features in the multi-dimensional data D2, but the disclosure is not limited thereto.

In addition, in step S650, the processor 304 may also feed the first data string D1 into a third deep neural network 720. The third deep neural network 720 may generate a third feature map FM3 by extracting features of the first data string D1.

In FIG. 7A, the third deep neural network 720 may include a recurrent neural network 722. In an exemplary embodiment, the recurrent neural network 722 may be embodied as, for example but not limited to, an LSTM model. In this case, the processor 304 may feed the first data string D1 into the recurrent neural network 722. The recurrent neural network 722 may output a second temporal feature vector TV2 as the third feature map FM3 in response to the first data string D1. In an exemplary embodiment, the recurrent neural network 722 may be understood as generating the second temporal feature vector TV2 (i.e., the third feature map FM3) by extracting relevant temporal features in the first data string D1, but the disclosure is not limited thereto.

After obtaining the first feature map FM1, the second feature map FM2, and the third feature map FM3, the processor 304 may perform step S660 to fuse the first feature map FM1, the second feature map FM2, and the third feature map FM3 into a specific feature vector SS1.

In FIG. 7A, the processor 304 may fuse the first feature map FM1, the second feature map FM2, and the third feature map FM3 into the specific feature vector SS1 by, for example, performing a fusion mechanism 730. Details of the fusion mechanism 730 will be further described with the aid of FIG. 7B.

Figure 7B:
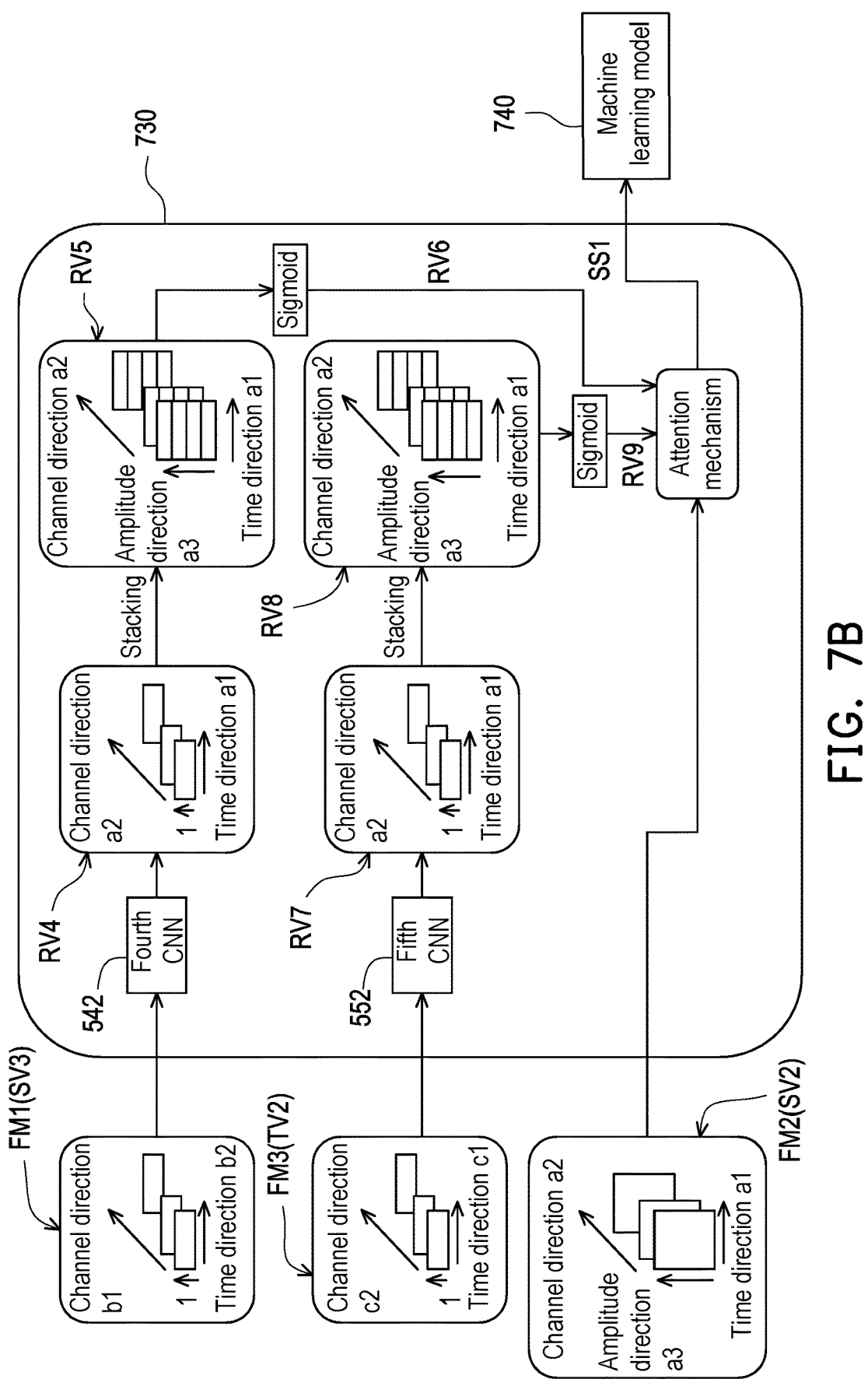
FIG. 7B is a schematic diagram of the fusion mechanism according to the second embodiment of the disclosure.

With reference to FIG. 7B, FIG. 7B is a schematic diagram of the fusion mechanism according to the second embodiment of the disclosure. In FIG. 7B, the first feature map FM1 and the third feature map FM3 may have three dimensions, such as amplitude, time, and channel. The magnitude in the dimension of amplitude of the first feature map FM1 and a magnitude in the dimension of amplitude of the third feature map FM3 may be 1 (as the first data string D1 is one-dimensional). Moreover, the magnitudes in dimensions such as time and channel of the first feature map FM1 may be respectively represented by b1 and b2. Furthermore, magnitudes in dimensions such as time and channel of the third feature map FM3 may be respectively represented by c1 and c2. In some embodiments, the size of the first feature map FM1 may be expressed by b1×b2×1, and a size of the third feature map FM3 may be expressed by c1×c2×1. Nonetheless, the disclosure is not limited thereto.

In addition, the second feature map FM2 may have three dimensions, such as amplitude, time, and channel. The magnitudes in the three dimensions of the second feature map FM2 may be represented by a1, a2, and a3, but are not limited thereto. In some embodiments, the size of the second feature map FM2 may be expressed by a1×a2×a3, but is not limited thereto.

In an exemplary embodiment, the processor 304 may feed the first feature map FM1 into a fourth convolutional neural network 542. The fourth convolutional neural network 542 may output a fourth reference feature vector RV4 in response to the first feature map FM1.

In FIG. 7B, the fourth convolutional neural network 542 may convert the first feature map FM1 into the fourth reference feature vector RV4 based on the magnitudes in dimensions such as channel and time of the second feature map FM2. Magnitudes in dimensions such as channel and time of the fourth reference feature vector RV4 may be the same as the magnitudes in dimensions such as channel and time of the second feature map FM2. In other words, the magnitudes in dimensions such as channel and time of the fourth reference feature vector RV4 may be respectively a1 and a2. In this case, a size of the fourth reference feature vector RV4 may be expressed by a1×a2×1, but is not limited thereto.

After that, the processor 304 may stack a plurality of fourth reference feature vectors RV4 into a fifth reference feature vector RV5 according to the size of the second feature map FM2. The size of the second feature map FM2 is the same as a size of the fifth reference feature vector RV5.

In FIG. 7B, the processor 304 may generate the fifth reference feature vector RV5 by stacking an a3 number of fourth reference feature vectors RV4 in the longitudinal direction. In this case, the size of the fifth reference feature vector RV5 may be expressed by a1×a2×a3 (which is the same as the size of the second feature map FM2).

After that, the processor 304 may convert the fifth reference feature vector RV5 into a sixth reference feature vector RV6. In an exemplary embodiment, the processor 304 may input the fifth reference feature vector RV5 into a Sigmoid function. This Sigmoid function may output the sixth reference feature vector RV6 in response to the fifth reference feature vector RV5. In an exemplary embodiment, the Sigmoid function may convert/map each element in the fifth reference feature vector RV5 into a value between 0 and 1, thus forming the sixth reference feature vector RV6, but the disclosure is not limited thereto.

In addition to the Sigmoid function, the processor 304 may also convert the fifth reference feature vector RV5 into the sixth reference feature vector RV6 by using other functions, for example but not limited to, Tan h function, Soft max function, ReLU, etc.

In an exemplary embodiment, the processor 304 may feed the third feature map FM3 into a fifth convolutional neural network 552. The fifth convolutional neural network 552 may output a seventh reference feature vector RV7 in response to the third feature map FM3.

In FIG. 7B, the fifth convolutional neural network 552 may convert the third feature map FM3 into the seventh reference feature vector RV7 based on the magnitudes in dimensions such as channel and time of the second feature map FM2. Magnitudes in dimensions such as channel and time of the seventh reference feature vector RV7 may be the same as the magnitudes in dimensions such as channel and time of the second feature map FM2. In other words, the magnitudes in dimensions such as channel and time of the seventh reference feature vector RV7 may be respectively a1 and a2. In this case, a size of the seventh reference feature vector RV7 may be expressed by a1×a2×1, but is not limited thereto.

After that, the processor 304 may stack a plurality of seventh reference feature vectors RV7 into an eighth reference feature vector RV8 according to the size of the second feature map FM2. The size of the second feature map FM2 is the same as a size of the eighth reference feature vector RV8.

In FIG. 7B, the processor 304 may generate the eighth reference feature vector RV8 by stacking an a3 number of seventh reference feature vectors RV7 in the longitudinal direction. In this case, the size of the eighth reference feature vector RV8 may be expressed by a1×a2×a3 (which is the same as the size of the second feature map FM2).

After that, the processor 304 may convert the eighth reference feature vector RV8 into a ninth reference feature vector RV9. In an exemplary embodiment, the processor 304 may input the eighth reference feature vector RV8 into a Sigmoid function. The Sigmoid function may output the ninth reference feature vector RV9 in response to the eighth reference feature vector RV8. In an exemplary embodiment, the Sigmoid function may convert/map each element in the eighth reference feature vector RV8 into a value between 0 and 1, thus forming the ninth reference feature vector RV9, but the disclosure is not limited thereto.

In addition to the Sigmoid function, the processor 304 may also convert the eight reference feature vector RV8 into the ninth reference feature vector RV9 by using other functions, for example but not limited to, Tan h function, Soft max function, ReLU, etc.

Then, the processor 304 may generate the specific feature vector SS1 based on the second feature map FM2, the sixth reference feature vector RV6, and the ninth reference feature vector RV9. In an exemplary embodiment, since the second feature map FM2, the sixth reference feature vector RV6, and the ninth reference feature vector RV9 have the same size, the processor 304 may generate the specific feature vector SS1 by performing an attention mechanism (e.g., dot product/dot addition/matrix inner product, etc.) based on the second feature map FM2, the sixth reference feature vector RV6, and the ninth reference feature vector RV9, but the disclosure is not limited thereto.

After obtaining the specific feature vector SS1, in step S670, the processor 304 may feed the specific feature vector SS1 into a machine learning model 740. The machine learning model 740 may output an identification result corresponding to the first data string D1 in response to the specific feature vector SS1. In an exemplary embodiment, the identification result may indicate, for example but not limited to, whether the first data string D1 includes AF symptoms.

In an exemplary embodiment, in order for the machine learning model 740 to have the above capabilities, during the training process of the machine learning model 740, the designer may feed specially designed training data into the machine learning model 740 for the corresponding learning by the machine learning model 740. For example, after obtaining a certain first data string that has been labeled as corresponding to AF (e.g., a one-dimensional electrocardiogram signal measured from a patient with AF), the processor 304 may generate a corresponding specific feature vector according to the above teaching in the second embodiment, and feed the specific feature vector into the machine learning model 740. Accordingly, the machine learning model 740 can learn AF-related features from the specific feature vector. In this case, when the machine learning model 740 receives the specific feature vector SS1 corresponding to the first data string D1 in the future, the machine learning model 740 may accordingly determine whether the first data string D1 includes AF symptoms, but the disclosure is not limited thereto.

Through experiments, the method provided by the disclosure can enable the machine learning models 540 and 740 to achieve good identification performance based on a small amount of training data. Moreover, compared to methods for performing identification based on the first data string D1 or the multi-dimensional data D2 alone, the method of the disclosure can also enable the machine learning models 540 and 740 to have an improved identification performance.

In order to make the above concept more comprehensible, further description will be provided below with the aid of Table 1.

TABLE 1

| Training data set | Accuracy (%) | | | Sensitivity (%) | | | Specificity (%) | | |
|---|---|---|---|---|---|---|---|---|---|
| | A | B | Diff. | A | B | Diff. | A | B | Diff. |
| Method 1: 1D CNN + LSTM | 88.41 | 88.70 | 0.29 | 82.82 | 86.76 | 3.94 | 91.76 | 89.87 | −1.59 |
| Method 2: Figure conversion + 2D CNN | 97.29 | 93.82 | −3.47 | 96.39 | 86.81 | −9.58 | 97.83 | 98.02 | 0.19 |
| Method 3: Decision fusion (late fusion) | 95.74 | 90.79 | −4.95 | 93.62 | 85.81 | −7.81 | 97.01 | 92.88 | −4.13 |
| Method 4: Method of this disclosure | 96.14 | 96.30 | 0.16 | 93.01 | 92.32 | −0.69 | 98.01 | 98.68 | 0.67 |

In Table 1, Method 1 may be understood as an identification mechanism based on the upper half part of FIG. 5A alone (i.e., an identification mechanism based on the first data string D1 alone), and Method 2 may be understood as an identification mechanism based on the lower half part of FIG. 5A alone (i.e., an identification mechanism based on the multi-dimensional data D2 alone). In addition, Method 3 may be understood as an identification mechanism that generates a comprehensive identification result by combining the identification results of Method 1 and Method 2 after obtaining the identification results of Method 1 and Method 2. Moreover, in Methods 1 to 4, the corresponding machine learning models may be respectively trained based on training data set A or B, where the training data set B includes about 60% of training data in the training data set A.

Table 1 shows that an accuracy achieved by training the machine learning model corresponding to Method 4 using the training data set A is about 96.14%, and an accuracy achieved by training the machine learning model corresponding to Method 4 using the training data set B is about 96.30%. As can be seen, training the machine learning model corresponding to Method 4 using whichever of the training data set A or B shows a difference in accuracy of about 0.16%. In other words, the machine learning model corresponding to the method of the disclosure can achieve good identification accuracy based on a small amount of training data.

By comparison, although training the machine learning model corresponding to Method 1 using the training data set A or B shows a difference in accuracy of about 0.29%, the overall identification accuracy is obviously inferior to the machine learning model corresponding to the method of the disclosure. Moreover, when the machine learning model corresponding to Method 2 is trained using the training data set A or B, it can be seen that the difference in accuracy reaches up to −3.47%. As can be seen, the machine learning model corresponding to Method 2 cannot achieve good identification accuracy based on a small amount of training data. Similarly, Table 1 shows that the machine learning model corresponding to Method 3 cannot achieve good identification accuracy based on a small amount of training data.

In addition, the fields related to sensitivity and specificity also shows the same trends as that of the field of accuracy. In other words, the machine learning model corresponding to the method of the disclosure can achieve good identification sensitivity and specificity based on a small amount of training data. However, the machine learning models trained by other methods cannot achieve good identification sensitivity and specificity based on a small amount of training data.

It should be understood that, although a one-dimensional electrocardiogram signal is taken as an example of the first data string D1 in the above, possible implementations of the disclosure are not limited thereto. In other embodiments, any kind of (one-dimensional) signal may serve a possible implementation of the first data string D1. Correspondingly, the multi-dimensional data D2 converted based on the first data string D1 is not limited to the electrocardiograms taught in the above embodiments, and may be data in other forms.

In summary of the foregoing, in the disclosure, the corresponding first feature map may be obtained after the first data string is obtained. In addition, in the disclosure, the first data string may also be converted into the corresponding multi-dimensional data, and then the corresponding second feature map may be obtained. After that, in the disclosure, the first feature map and the second feature map may be fused into the specific feature vector through a specific mechanism. Then, the trained machine learning model may output the corresponding identification result based on the specific feature vector. Accordingly, the machine learning model can achieve good identification performance based on a small amount of training data, thus reducing the time and labor costs for labeling the data.

By converting the first data string (e.g., an electrocardiogram signal) into the multi-dimensional data with different patterns (e.g., an electrocardiogram), the diversity of the data can be increased accordingly to achieve feature enrichment. In addition, although the first data string and the multi-dimensional data have different patterns, since they are highly complementary (i.e., one of them has the features that the other lacks), the machine learning model can output improved decisions, thus enhancing the relevant classification performance. In addition, in the disclosure, since good identification/classification performance can be obtained with requirements of a small amount of training data, the costs of labeling the training data can be reduced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A computer-implemented method for context-aware classification of physiological signal data, comprising:
  obtaining a first signal stream comprising one-dimensional physiological data;
  processing the first signal stream using a first neural network, to generate a first feature map;

transforming the one-dimensional physiological data of the first signal stream into a higher-dimensional representation suitable for spatial processing;

processing the higher-dimensional representation using a second neural network;

projecting the first feature map to generate a reference feature vector aligned with the second feature map;

fusing the reference feature vector and the second feature map; and classifying to generate a semantic output of a physiological condition.

2. The method according to claim 1, wherein the first neural network comprises a first convolutional neural network and a recurrent neural network, and the method comprises:

feeding the first signal stream into the first convolutional neural network, wherein the first convolutional neural network generates a first spatial feature vector in response to the first signal stream; and feeding the first spatial feature vector into the recurrent neural network, wherein the recurrent neural network generates a first temporal feature vector as the first feature map in response to the first spatial feature vector.

3. The method according to claim 1, wherein the second neural network comprises a second convolutional neural network, and the method comprises:

feeding the multi-dimensional data into the second convolutional neural network, wherein the second convolutional neural network generates a second spatial feature vector as the second feature map in response to the multi-dimensional data.

4. The method according to claim 1, wherein fusing the reference feature vector and the second feature map comprises:

feeding the first feature map into a third convolutional neural network, wherein the third convolutional neural network generates a first reference feature vector in response to the first feature map;

stacking a plurality of the first reference feature vectors into a second reference feature vector based on a size of the second feature map, wherein the size of the second feature map is equal to a size of the second reference feature vector;

transforming the second reference feature vector into a third reference feature vector; and generating the specific feature vector based on the second feature map and the third reference feature vector.

5. The method according to claim 4, wherein transforming the second reference feature vector into the third reference feature vector comprises:

inputting the second reference feature vector into a Sigmoid function, wherein the Sigmoid function generates the third reference feature vector in response to the second reference feature vector, and each element in the third reference feature vector is within a value range between 0 and 1.

6. The method according to claim 4, wherein generating the specific feature vector based on the second feature map and the third reference feature vector comprises:

applying an attention mechanism configured to weight features in the second feature map based on corresponding values in the third reference feature vector, and generating the specific feature vector based on the attention-weighted features.

7. The method according to claim 1, further comprising:

processing the first signal stream using a third neural network to generate a third feature map; and wherein fusing the reference feature vector and the second feature map comprises:

fusing the first feature map, the second feature map, and the third feature map into the specific feature vector.

8. The method according to claim 7, wherein the first neural network comprises a convolutional neural network, and the method comprises:

processing the first signal stream using the convolutional neural network to generate a first feature map.

9. The method according to claim 7, wherein the third neural network comprises a recurrent neural network, and the method comprises:

processing the first signal stream using the recurrent neural network to generate a third feature map.

10. The method according to claim 7, wherein fusing the first feature map, the second feature map, and the third feature map to generate the specific feature vector comprises:

processing the first feature map using a fourth convolutional neural network to generate a fourth reference feature vector;

stacking a plurality of the fourth reference feature vectors into a fifth reference feature vector based on a spatial dimension of the second feature map, wherein a size of the second feature map corresponds to a size of the fifth reference feature vector;

transforming the fifth reference feature vector into a sixth reference feature vector;

processing the third feature map using a fifth convolutional neural network to generate a seventh reference feature vector;

stacking a plurality of the seventh reference feature vectors into an eighth reference feature vector based on the spatial dimension of the second feature map, wherein a size of the second feature map corresponds to a size of the eighth reference feature vector;

transforming the eighth reference feature vector into a ninth reference feature vector; and generating the specific feature vector based on the second feature map, the sixth reference feature vector, and the ninth reference feature vector.

11. The method according to claim 10, wherein transforming the fifth reference feature vector into the sixth reference feature vector comprises:

applying a Sigmoid function to the fifth reference feature vector, wherein the Sigmoid function outputs the sixth reference feature vector in response to the fifth reference feature vector, wherein each element in the sixth reference feature vector is between 0 and 1; and wherein transforming the eighth reference feature vector into the ninth reference feature vector comprises:

applying the Sigmoid function to the eighth reference feature vector, wherein the Sigmoid function outputs the ninth reference feature vector in response to the eighth reference feature vector, wherein each element in the ninth reference feature vector is between 0 and 1.

12. The method according to claim 10, wherein generating the specific feature vector based on the second feature map, the sixth reference feature vector, and the ninth reference feature vector comprises:

applying an attention mechanism to compute the specific feature vector from the second feature map, the sixth reference feature vector, and the ninth reference feature vector.

13. The method according to claim 1, wherein the higher-dimensional representation comprises a waveform image generated based on the first signal stream.

14. An electronic device for classifying physiological signal data with contextual awareness, comprising:
a memory storing executable instructions; and
a processor configured to execute the instructions to:
receive a one-dimensional physiological signal;
process the signal using a first neural network to obtain a first feature map;
transform the one-dimensional physiological data of the first signal stream into a higher-dimensional representation suitable for spatial processing;
process the higher-dimensional data using a second neural network to obtain a second feature map;
project the first feature map to generate a reference feature vector aligned with the second feature map;
fuse the reference feature vector and the second feature map; and
classify a result to output a semantic indicator of physiological condition.

15. The electronic device according to claim 14, wherein the first neural network comprises a first convolutional neural network and a recurrent neural network, and the processor is configured to:
feed the first signal stream into the first convolutional neural network, wherein the first convolutional neural network generates a first spatial feature vector in response to the first signal stream; and
feed the first spatial feature vector into the recurrent neural network, wherein the recurrent neural network generates a first temporal feature vector as the first feature map in response to the first spatial feature vector.

16. The electronic device according to claim 14, wherein the second neural network comprises a second convolutional neural network, and the processor is configured to:
feed the multi-dimensional data into the second convolutional neural network, wherein the second convolutional neural network generates a second spatial feature vector as the second feature map in response to the multi-dimensional data.

17. The electronic device according to claim 14, wherein the processor is configured to:
feed the first feature map into a third convolutional neural network, wherein the third convolutional neural network generates a first reference feature vector in response to the first feature map;
stack a plurality of the first reference feature vectors into a second reference feature vector based on a size of the second feature map, wherein the size of the second feature map is equal to a size of the second reference feature vector;
transform the second reference feature vector into a third reference feature vector; and
generate the specific feature vector based on the second feature map and the third reference feature vector.

18. The electronic device according to claim 17, wherein the processor is configured to:
input the second reference feature vector into a Sigmoid function, wherein the Sigmoid function generates the third reference feature vector in response to the second reference feature vector, and each element in the third reference feature vector is within a value range between 0 and 1.

19. The electronic device according to claim 17, wherein generating the specific feature vector based on the second feature map and the third reference feature vector comprises:
applying an attention mechanism configured to weight features in the second feature map based on corresponding values in the third reference feature vector, and generating the specific feature vector based on the attention-weighted features.

20. The electronic device according to claim 14, the processor is further configured to:
process the first signal stream using a third neural network to generate a third feature map; and wherein fusing the reference feature vector and the second feature map comprises:
fusing the first feature map, the second feature map, and the third feature map into the specific feature vector.

21. The electronic device according to claim 20, wherein the first neural network comprises a convolutional neural network, and the processor is configured to:
process the first signal stream using the convolutional neural network to generate a first feature map.

22. The electronic device according to claim 20, wherein the third neural network comprises a recurrent neural network, and the processor is configured to:
process the first signal stream using the recurrent neural network to generate a third feature map.

23. The electronic device according to claim 20, wherein the processor is configured to:
process the first feature map using a fourth convolutional neural network to generate a fourth reference feature vector;
stack a plurality of the fourth reference feature vectors into a fifth reference feature vector based on a spatial dimension of the second feature map, wherein a size of the second feature map corresponds to a size of the fifth reference feature vector;
transform the fifth reference feature vector into a sixth reference feature vector;
process the third feature map using a fifth convolutional neural network to generate a seventh reference feature vector;
stack a plurality of the seventh reference feature vectors into an eighth reference feature vector based on the spatial dimension of the second feature map, wherein a size of the second feature map corresponds to a size of the eighth reference feature vector;
transform the eighth reference feature vector into a ninth reference feature vector; and
generate the specific feature vector based on the second feature map, the sixth reference feature vector, and the ninth reference feature vector.

24. The electronic device according to claim 23, wherein the processor is configured to:
apply a Sigmoid function to the fifth reference feature vector, wherein the Sigmoid function outputs the sixth reference feature vector in response to the fifth reference feature vector, wherein each element in the sixth reference feature vector is between 0 and 1; and
wherein transforming the eighth reference feature vector into the ninth reference feature vector comprises:
applying the Sigmoid function to the eighth reference feature vector, wherein the Sigmoid function outputs the ninth reference feature vector in response to the eighth reference feature vector, wherein each element in the ninth reference feature vector is between 0 and 1.

25. The electronic device according to claim 23, wherein the processor is configured to:

apply an attention mechanism to compute the specific feature vector from the second feature map, the sixth reference feature vector, and the ninth reference feature vector.

26. The electronic device according to claim 14, wherein the higher-dimensional representation comprises a waveform image generated based on the first signal stream.

27. A non-transitory computer-readable storage medium storing instructions that, when executed by a processor, cause a computing system to perform the method of claim 1.

* * * * *